United States Patent [19]
Stannis et al.

[11] Patent Number: 5,161,700
[45] Date of Patent: Nov. 10, 1992

[54] ADJUSTABLE STORAGE SYSTEM FOR A VEHICLE

[75] Inventors: Gordon J. Stannis; David A. Muyres, both of Holland, Mich.

[73] Assignee: Prince Corporation, Holland, Mich.

[21] Appl. No.: 646,859

[22] Filed: Jan. 28, 1991

[51] Int. Cl.⁵ .............................................. B60R 5/04
[52] U.S. Cl. ...................................... 211/175; 211/71; 211/184; 224/311
[58] Field of Search .................. 211/43, 71, 126, 175, 211/184; 220/23.2, 23.83; 224/42.42, 311

[56] References Cited

U.S. PATENT DOCUMENTS

| | | | |
|---|---|---|---|
| 113,830 | 4/1871 | Anderson | 211/43 X |
| 583,494 | 6/1897 | Lundberg | 211/43 |
| 1,489,804 | 4/1924 | Van Vlissengen | 211/43 X |
| 2,020,514 | 11/1935 | Moffitt | 211/43 X |
| 3,027,017 | 3/1960 | Luxeder | 211/184 |
| 3,438,673 | 6/1967 | Nelson | 296/37 |
| 4,029,244 | 6/1977 | Roberts | 224/42 |
| 4,226,348 | 10/1980 | Dottor et al. | 224/42 |
| 4,236,854 | 12/1980 | Rogers | 410/121 |
| 4,358,035 | 11/1982 | Heidecker | 224/42 |
| 4,538,737 | 9/1985 | Delaney | 211/71 |
| 4,540,213 | 9/1985 | Herlitz | 296/37 |
| 4,684,087 | 8/1987 | Spickard | 248/97 |
| 4,718,584 | 1/1988 | Schoeny | 224/42 |
| 4,838,745 | 6/1989 | Haydock | 410/121 |
| 4,884,733 | 12/1989 | Geeves | 224/311 |

Primary Examiner—Carl D. Friedman
Assistant Examiner—Derek J. Berger
Attorney, Agent, or Firm—Price, Heneveld, Cooper, DeWitt & Litton

[57] ABSTRACT

An adjustable storage system is provided which includes a flat base, an upstanding fixed side attached to the base, and an adjustable slideable side which slides laterally on the base and cooperates with the fixed side to provide lateral support and containment for packages placed therebetween. A guiding mechanism allows the sliding side to move freely. The system further includes a locking mechanism to secure the slideable side in a given location. The slideable side also includes a hand grip and thumb control button operably connected to the locking mechanism to lock and unlock the slideable side. The preferred embodiment also includes a telescoping member which extends between the fixed and slideable sides to support the sides and to prevent packages from tipping.

25 Claims, 2 Drawing Sheets

ADJUSTABLE STORAGE SYSTEM FOR A VEHICLE

BACKGROUND OF THE INVENTION

The present invention relates to storage systems for vehicles and particularly to adjustable storage systems providing lateral support for packages.

Vehicles are used to transport packages having a variety of shapes and sizes. Often these packages contain loose materials, which will tip over and spill if not contained or laterally supported. Grocery bags are a typical example of an unstable package which can easily tip over in the rear storage area of a station wagon or other vehicle. This problem becomes particularly annoying when cornering a vehicle which produces lateral forces tending to tip such containers which may include fragile articles.

Various devices have been designed to support packages in the open carrying areas of vehicles. Such devices typically include a base an a variety of plug-in walls to define discrete storage bins. Such devices, however, lack continuous adjustability or, alternatively, are difficult and inconvenient to use. Thus, there still exists a need for an adjustable storage system for vehicles which can provide convenient and easy to use infinitely adjustable storage for the containment of unstable packages.

SUMMARY OF THE INVENTION

The system of the present invention provides an adjustable storage system which can be incorporated as original equipment in a vehicle or provided as an aftermarket accessory. The system includes a platform with at least one fixed side and a movable side or divider wall which is slideably mounted to the platform and can be selectively locked in a variety of substantially continuously adjusted positions with respect to the fixed side to provide lateral support for packages of any size or shape which are placed therebetween. The preferred embodiment includes telescoping members which adjustably extend between the two sides and provide additional support for packages. In one embodiment also, the platform can be integrally formed in a generally U-shaped configuration with a pair of fixed endwalls defining a pair of sides extending upwardly from a base at opposite ends thereof with the movable member extending between the fixed sides. In the preferred embodiments, the movable side includes an easily reachable control handle which facilitates control of the movable side.

Such a system thus provides an adjustable and easy to use storage system for packages in a vehicle either as original equipment or as an add-on accessory. These and other features, objects, and advantages will become apparent upon reading the following description thereof together with reference to the accompanying drawings in which:

DETAILED DESCRIPTION OF THE PREFERRED EMBODIMENTS

Figure 1:
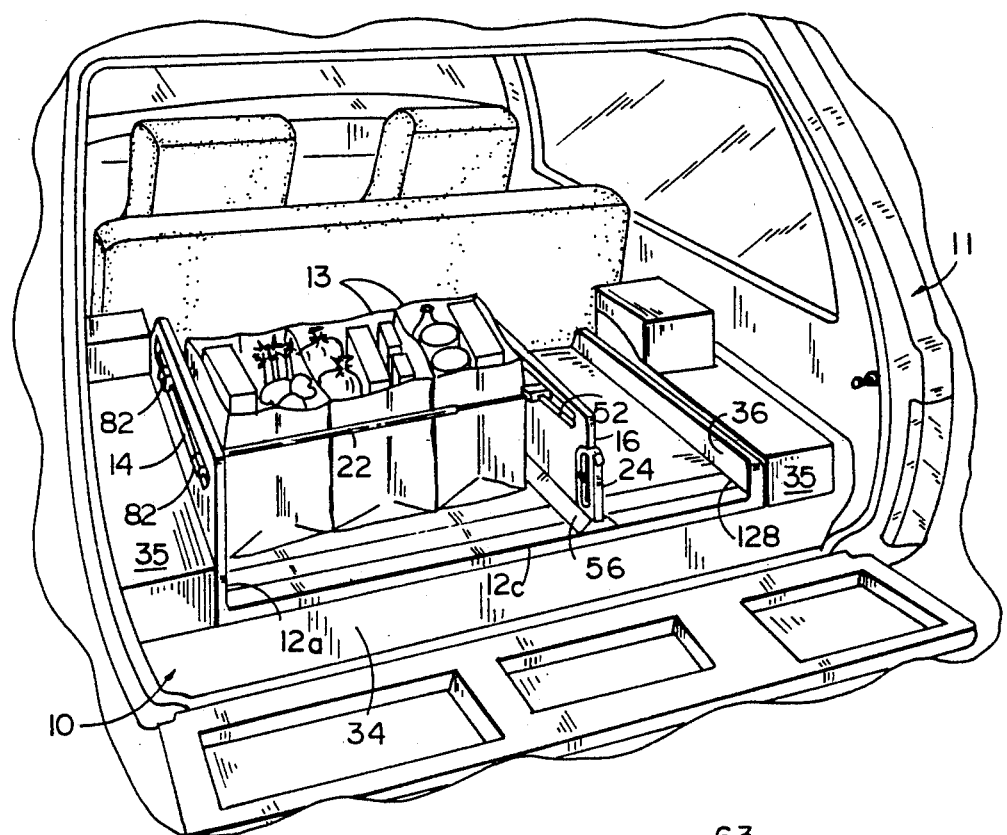
FIG. 1 is a rear perspective view of a vehicle including a storage system embodying the present invention.
Figure 2:
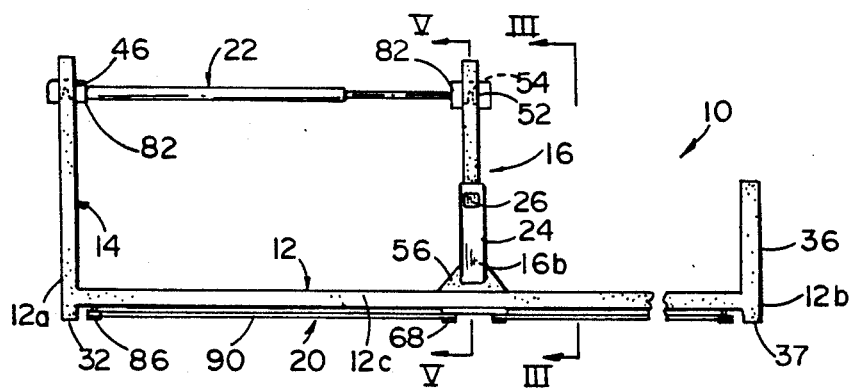
FIG. 2 is a rear elevational view, partly broken-away, of the structure shown in FIG. 1.

Referring initially to FIGS. 1 and 2, there is shown an adjustable storage system 10 embodying the present invention and which is particularly adapted for mounting within the rear storage area of a vehicle 11 such as a station wagon, van, or the like. In the preferred embodiment, storage system 10 includes a substantially planar platform such as flat base 12, and at least one upstanding fixed side 14 which extends integrally upwardly from an edge of base 12, and an adjustable movable side 16 which serves as a divider wall between side 14 and opposite side 36. Slideable side 16 slides laterally on base 12 and cooperates with fixed side 14 to provide lateral support and containment for packages 13 such as grocery bags, duffel bags, or the like.

Figure 9:
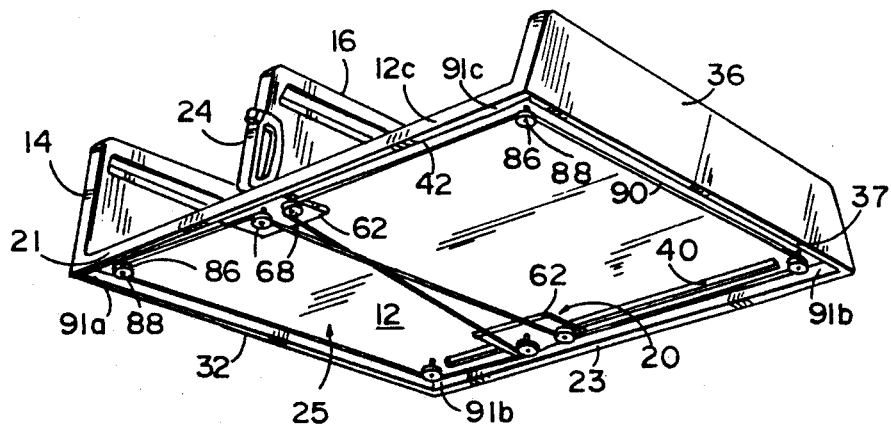
FIG. 9 is a bottom perspective view of the storage system showing the control mechanism for the movable side.

The movable side 16 can be substantially continuously adjusted and locked in position in a desired spaced relationship to side 14 by the guide and locking mechanism 20 which extends between base 12 and side 16. In the preferred embodiment the storage system also includes a second fixed side 36 which extends integrally upwardly from an opposite edge of base 12 to define, as best seen in FIG. 2, a generally U-shaped integral fixed support member. The lower ends of sides 14 and 36 extend below the lower surface of base 12 to define legs 32 and 37 respectively for providing clearance for the guide mechanism 20 which extends in part under base 12. As best seen in FIG. 9, legs 32 and 37 are integral with front and rear legs 21 and 23 respectively, to define a downwardly extending peripheral flange extending around the periphery of base 12. This defines a recess 25 (FIG. 9) for the guide mechanism 20. The width of the U-shaped platform and sides is selected to substantially span the space between the sidewalls 35 (FIG. 1) of the vehicle 11 such that once installed, the system 10 cannot shift laterally in the vehicle. A universal sized unit 10 can include suitable spacers (not shown) which can extend laterally outwardly from side 14 and be adjustable to allow a single sized storage system 10 to fit most vehicles. Also as will become apparent, the base 12 could be integrally included in the floor 34 of the vehicle 11. Sides 14 and 36 can be of the same height or, as shown, side 36 can be lower to conserve material with the primary adjustable storage area being located to the left of movable side or wall 16.

A U-shaped toothed track 18 (FIG. 5) is mounted in spaced relationship behind the front edge 12C of base 12 in a channel 42 and cooperates with locking mechanism 28 to secure slideable side 16 in a given location. The guiding mechanism 20 prevents sliding side 16 from binding or tipping as slideable side 16 is moved adjustably from side to side. At least one and preferable two telescoping members 22 extend between sides 14 and 16 at selectable locations thereon to prevent packages from tipping fore or aft as described below. The preferred embodiment also includes a hand grip assembly 24 conveniently located at the front of slideable side 16 to allow the user to control the position of side 16. Member 24 includes a thumb actuated locking button 26 for controlling the locking of side 16 in a desired position. Thumb control button 26 is conveniently located near the top of in grip assembly 24 and is operably connected to a locking mechanism 28 by a cable 30 to lock and unlock slideable side 16 for lateral movement. Having briefly described the major elements of the storage system of the present invention, a detailed description of the storage system follows.

Base 12 (FIGS. 2-3) is a substantially flat planar member and can be made out of various materials such as fiberglass, metal, structural foam or a solid polymeric material. Base 12 is substantially rectangular having side edges 12A, 12B, a rear edge 12C, and a forward edge 12D. Base 12 further includes a peripheral downwardly extending ridge as discussed above which defines a recess 25 to space base 12 slightly above a supporting surface 34 such as the floor of a vehicle to provide clearance for guiding mechanism 20. Base 12 further includes two slots 38 and 40 which extend parallel to and in spaced relationship from the forward edge 12C and rear edge 12D of base 12, respectively, and between fixed sides 14 and 36. Slots 38 and 40 cooperate with 'T' shaped slide members 62 and 63 to maintain slideable side 16 vertically upright and also cooperate to allow side 16 to move laterally, as discussed below.

Fixed side 14 is integrally connected to edge 12A of flat base 12 and upstanding therefrom. Near the upper edge of fixed side 14 is a horizontal slot 46 which extends parallel to the upper edge of fixed side 14 and substantially the full length thereof. Slot 46 cooperates with telescoping member 22 as discussed below. The preferred embodiment includes a second fixed side 36 located opposite fixed side 14, side 36 being located at edge 12B. Second fixed side 36 is integrally connected to flat base 12 and upstanding therefrom similar to fixed side 14. As discussed above, fixed sides 14 and 36 cooperate with mating surfaces in sides 35 of vehicle 11 to laterally locate adjustable storage system 10 within vehicle 11. Base 12 also includes a transverse channel 42 extending parallel to and adjacent to slot 38 which receives toothed track 18.

Slideable side 16 (FIGS. 2-6) is slideably adjustable from side to side on flat base 12, and is upstanding therefrom. Slideable side 12 includes a forward end 16A and rearward end 16B with the forward end 16A extending toward the front of vehicle 11. Slideable side 16 has an upstanding wall section 50, a triangular stabilizer member or base 56 which supports wall section 50, and a hand grip 24 which provides a convenient grip for side 16. Located near the top of upstanding wall 50 is a slot 52 which extends substantially the full length of upstanding wall section 50 and correspondingly parallel to slot 46 in fixed wall 14. The lower edge of slot 52 defines a necked rail portion 54 (FIG. 7) designed to cooperate with telescoping member 22 as noted below. Stabilizer member 56 is integrally connected to the bottom of wall section 50 and is defined by an enlarged lower flat surface 58 and two inclined surfaces 60. Flat surface 58 slides on flat base 12 with a sufficiently low coefficient of friction such that slideable side 16 can be laterally adjusted on flat base 12 without undue effort. It is contemplated that stabilizer member 56 might include rollers or other means to facilitate lateral movement of slideable side 16. The triangular like cross-section formed by surfaces 58 and 60 provide sufficient support necessary to hold upstanding wall section 50 substantially perpendicular to base 12 as the side is moved and as it holds packages.

Figure 6:
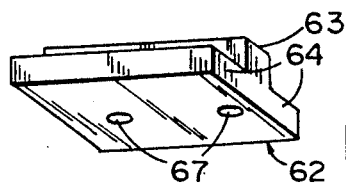
FIG. 6 is a perspective view of a 'T' shaped sliding member in connection with the invention.
Figures 3, 4:
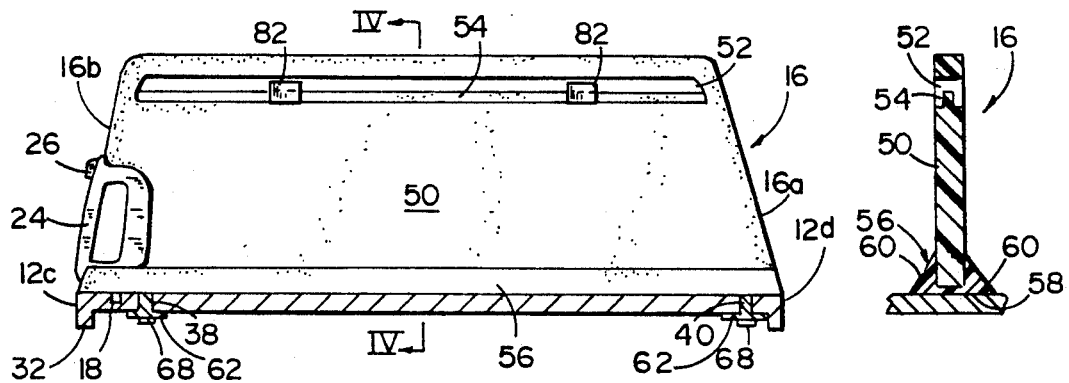
FIG. 3 is a partial cross-sectional view taken through section line III—III in FIG. 2.
FIG. 4 is a fragmentary cross-sectional view taken through section IV—IV in FIG. 3.
Figures 5, 7, 8:
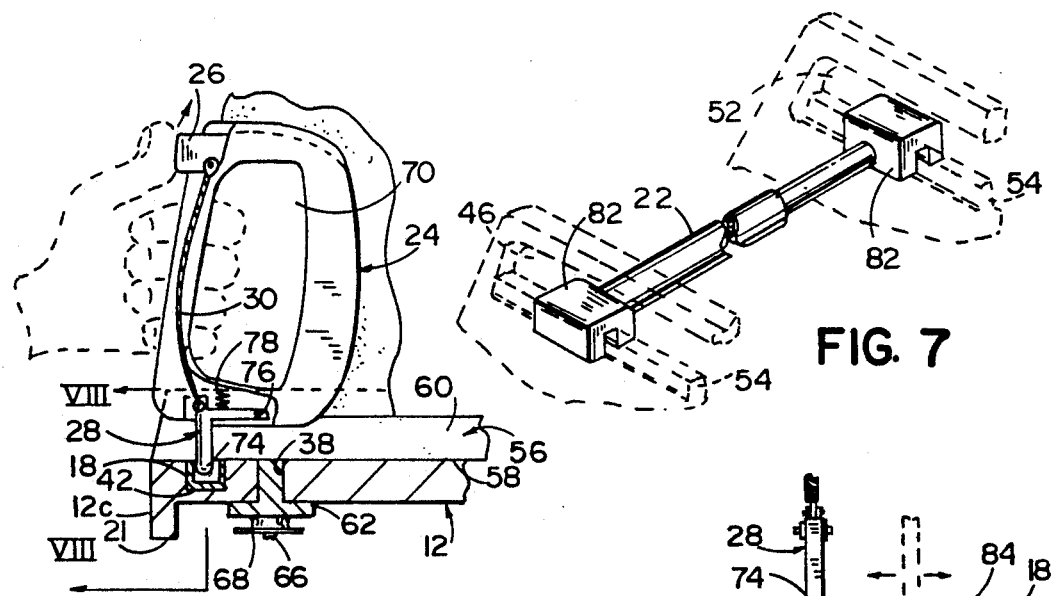
FIG. 5 is an enlarged fragmentary cross-sectional view taken through section line V—V in FIG. 2.
FIG. 7 is a fragmentary perspective view of a telescoping member installed between two sides of the system.
FIG. 8 is an enlarged fragmentary cross-sectional view of the detent locking mechanism for the movable slide taken through section line VIII—VIII in FIG. 5.

The side 16 is supported to base 12 by a pair of elongated 'T' shaped members 62 as seen in FIGS. 3, 5, and 9 with one of the support members 62 being shown in FIG. 6. Each of the support members 62 extends through a slot 38 or 40 in base 12 and is attached to the bottom flat surface 58 of stabilizer member 56 on slideable wall 16 by screws 66 or other suitable fastening means. Elongated 'T' shaped member 62 includes an upstanding center section 63 which slides within slots 38 or 42 and a base 64 which extends laterally from center section 63 and engages the under side of flat base 12 to prevent upstanding wall section 50 from tipping. Two long screws 66 extend through pulley 68 and holes 67 in each elongated 'T' shaped member 62 into stabilizer member 56. The second forward 'T' shaped member 62 similarly extends through slot 40 in base 12 and attaches to the forward end 16A of slideable side 16.

Integrally mounted to rearward end 16B of slideable side 16 is hand grip assembly 24. Hand grip 24 defines an opening 70 through which a person's fingers are passed when gripping the outer arm 72 of the grip. Grip 24 further includes a thumb button 26 near the upper end of arm 72. Thumb button 26 is conveniently located and easily pushed when hand grip 24 is gripped by a person. Hand grip 24 is substantially ovally shaped and fits into a rearwardly facing 'C' shaped cutaway in the rear of slideable side 16 in wall section 50 and stabilizer member 56. Hand grip 24 is permanently secured to rearward end 16b by any of several attachment means such as fasteners, adhesives and the like. It also could be formed as and integral part of member 16. Arm 72 is substantially tubular to carry therein a release cable 30 associated with the locking mechanism 28 which includes a detent 74 pin pivotally mounted to the bottom of arm 72 at hinge 76. A bias spring 78 biases detent pin 74 to a normally downward position to engage toothed track 18 as best seen in FIG. 5. The release cable 30 extends from the front of the L-shaped detent pin 74 up to thumb button 26 such that when thumb button 26 is pressed, release cable 30, which is in tension, pivots detent pin 74 away from toothed track 18 and allows slideable side 16 to be manually moved laterally When thumb button 26 is released, bias spring 78 biases detent 74 downwardly back into engagement with toothed track 18 thus securing slideable side 16 in a given location.

Track 18 (FIGS. 5 and 8) is designed to cooperate with slideable side 16 (and specifically detent 74) to provide a locking mechanism to locate slideable side 16 in one or more positions. As best shown in FIG. 8, track 18 includes teeth 84. Detent 74 can be pivoted into engagement with teeth 84 of track 18 and pivoted out of engagement allowing slideable side 16 to move laterally. The triangular teeth 84 of that track 18 are sufficiently close together so as to provide substantially continuous adjustment of side 16 between sides 14 and 36 of the storage system.

One and preferably two telescoping members 22 (FIGS. 2 and 7) extend between fixed side 14 and slideable side 16. Telescoping member 22 includes notched ends 82 which fit over rails 54 and cooperate with slot 46 in fixed side 14 and slot 52 in slideable side 16 such that telescoping members 22 can slide adjustably forwardly or rearwardly as desired to both stabilize side 16 as well as provide fore and aft support for the packages 13. In the preferred embodiment, notched ends 82 permit telescoping members 22 to be removed for storage. Notched ends 82 are designed to frictionally engage sides 14 and 16 when pressed downwardly onto necked rail 54 such that they resist forward of rearward movement after being pressed downward. Alternatively, telescoping members 22 (i.e. notched ends 82) can be lifted upwardly to release their frictional engagement and permit fore and aft adjustment. It is contemplated that bunge cords (not shown) may also be used in connection with the telescoping members to assist in securing packages within the sides and telescoping members.

The preferred embodiment of the invention also includes a system of cables located underneath flat base 12 which cooperate with base 12 and slideable side 16 to control the motion of and prevent binding of slideable side 16 as it is moved from side to side. Four cable holding pulleys 86 are located at the four corners of rectangular flat base 12 and within recess 25. The pulleys 86 are fixed by pivot bolts 88 screwed into the bottom of base 12 which permit pulleys 86 to rotate. Two additional pulleys 68 are mounted to the underside of elongated 'T' shaped members 62. An anti-binding cable 90 is routed from a first corner 91A (pulley 86) to a first elongated 'T' shaped member 62 (pulley 68), and then extends across the under side of flat base 12 to second elongated 'T' shaped member 62 (pulley 68). Cable 90 further extends to a second corner 91B (pulley 86) on flat base 12 which is diagonally opposite the first corner 91A. A second portion of cable 90 similarly extends from a third corner 91C of flat base 12 to a first elongated 'T' shaped member 62, across the under side of flat base 12 to the second elongated 'T' shaped member 62 and further extends to fourth corner 91D of flat base 12. In the preferred embodiment, cable 90 is a continuous cable with the cable portions forming substantially a figure '8' the underside of base 12. At each corner 91A-91D is a pulley 86 which facilitates movement of slideable side 16, cable 90 cooperating with pulleys 68 and 86 to prevent skewing and therefore binding of slideable side 16 as slideable side 16 is moved across base 12.

OPERATION

Having described the elements and components of the adjustable storage system which embodies the present invention, the purpose and utility of the present invention should be apparent to those skilled in the art. Briefly however, the operation of this invention is described hereinafter. Adjustable storage system 10 is installed in a vehicle 11 either as original equipment or as an after market accessory. Adjustable storage system 10 is placed within vehicle 11 with hand grip assembly 24 located in a convenient accessible location When an operator desires to use storage system 10, the operator places the packages which are to be contained or laterally supported between fixed side 14 and slideable side 16 on flat base 12. An operator then grips hand grip 24 and presses thumb button 26 releasing detent 74 from tooth track 18. This allows the operator to move slideable side 16 laterally toward fixed side 14 thereby pressing the packages somewhat together. In this position, the packages are contained side-to-side and supported from tipping side-to-side.

In the preferred embodiment, telescoping members 22 are then placed within slots 46 on fixed side 14 and slot 52 on slideable side 16. This may occur either before or after the lateral adjustment of slideable side 16. Telescoping member 22 then is slid rearwardly into engagement with the packages to be laterally supported and pressed downward lightly to frictionally engage notched ends 82 to rails 54 within slots 52 and 46. A second telescoping member 22 may also be used on the back side to cooperate with the first telescoping member 22. Alternatively, a single telescoping member 22 can be used on the back side of the packages to hold the packages toward the access opening in the vehicle. Also, one or more bunge cords may be used as desired.

Thus, it is seen with the storage system of the present invention, a convenient, self contained, and highly adjustable storage system is provided for adjustably supporting various packages and items to be transported in a vehicle. In the preferred embodiment of the present invention, the system is particularly shaped and adapted to contain packages and laterally support packages in four directions. It will become apparent to those skilled in the art that various modifications to the preferred embodiment of the invention can be made with departing from the spirit and scope thereof as defined as the appended claims.

The embodiments of the invention in which an exclusive property or privilege is claimed are defined as follows:

1. An adjustable storage system for vehicles comprising:
   a substantially flat base including means for securing said base within a vehicle;
   an upright fixed planar sidewall attached to the flat base;
   an upright movable planar sidewall which is slideably adjustable and which cooperates with said fixed sidewall to provide lateral support to packages placed therebetween, said movable planar sidewall including first and second ends and being oriented generally parallel to said fixed planar sidewall;
   means for slideably mounting said movable sidewall to said base for movement toward and away from said fixed sidewall;
   cable means coupled to said first and second ends of said movable sidewall and said base for maintaining the general parallel orientation of said movable planar sidewall to said fixed planar sidewall as said movable planar sidewall is moved to thereby prevent binding as said movable sidewall is moved against packages placed on said base, said cable being substantially fixed in length; and
   means for locking said movable sidewall into at least one use position.

2. An adjustable storage system as defined in claim 1 wherein said base includes first and second corners that are diagonally opposite, and further includes third and fourth corners that are diagonally opposite, and wherein said cable means includes a first cable section extending from said first corner operably around said first and second ends of said movable sidewall to said second corner and further includes a second cable section extending from said third corner operably around said first and second ends of said movable sidewall to said fourth corner, to thus positively maintain the generally parallel orientation of said movable sidewall.

3. An adjustable storage system as defined in claim 2, wherein said cable and said pulley are positioned under said base.

4. An adjustable storage system for vehicles comprising:
   a substantially flat base including means for securing said base within a vehicle;
   an upright fixed planar sidewall attached to the flat base;
   an upright movable planar sidewall which is slideably adjustable and which cooperates with said fixed sidewall to provide lateral support to packages placed therebetween;
   means for slideably mounting said movable sidewall to said base for movement toward and away from said fixed sidewall;
   means coupled to said movable sidewall and said base for guiding said movable sidewall to prevent binding as said movable sidewall is moved against packages placed on said base;
   means for locking said movable sidewall into at least one use position; and
   at least one telescoping member extending between said fixed sidewall and said movable sidewall to provide additional lateral support for packages placed between said fixed and movable sidewall.

5. An adjustable storage system as defined in claim 4 wherein said fixed sidewall has a first slot positioned lengthwise near the upper edge thereof, and said movable sidewall has a corresponding second slot positioned lengthwise near the upper edge thereof and wherein said telescoping member includes ends which mateably engage said slots.

6. An adjustable storage system as defined in claim 5 wherein said telescoping member is removable.

7. An apparatus as defined in claim 4 wherein said movable sidewall includes a hand grip located on one of said ends.

8. An adjustable storage system as defined in claim 7 wherein said grip includes a control button which is operably connected to said locking means for locking and releasing said locking means.

9. An adjustable storage system as defined in claim 8 wherein said locking means includes a notched track mounted in said base and a locking pin which is operably connected to said thumb button such that said pin disengages from said notched track when said control button is depressed and engages said notched track when said control button is released.

10. An adjustable storage system as defined in claim 4 wherein said movable sidewall includes an enlarged bottom, wherein said base includes at least one laterally extending slot, and wherein said means for slideably mounting said movable sidewall to said base includes at least one elongated 'T' shaped member which cooperates with said laterally extending slot in said base and attaches to said enlarged bottom to both hold said movable sidewall upright and also reduce the tendency of the movable sidewall to bind as said movable sidewall is moved laterally.

11. An adjustable storage system for vehicles comprising:
   a substantially flat base including means for securing said base within a vehicle, said base including first and second laterally extending slots;
   an upright fixed planar sidewall attached to the flat base;
   an upright movable planar sidewall which is slideably adjustable and which cooperates with said fixed sidewall to provide lateral support to packages placed therebetween said movable sidewall including a first and second end, and further including a first and a second slide extending from said first and second ends respectively for extending through said first and second laterally extending slots in said base for slideably supporting said movable sidewall on said base, said planar sidewall including a hand grip defined in part by an opening located in said first end, said hand grip including a control button thereon positioned adjacent said opening so that the fingers of an operator can be placed through said opening with the operator's thumb being located proximate said control button;
   means for slideably mounting said movable sidewall to said base for movement toward and away from said fixed sidewall;
   means coupled to said movable sidewall and said base for guiding said movable sidewall to prevent binding as said movable sidewall is moved against packages placed on said base; and
   means for locking said movable sidewall into at least one use position.

12. An adjustable storage system as defined in claim 11 wherein each of said slides are inverted T-shaped members with a center leg extending through one of said slots in said base and a cross member which engages the underside of said base to hold said movable sidewall to said base.

13. An adjustable storage system for vehicles comprising:
   a generally U-shaped platform including a base and a pair of sidewalls defining an open end, said platform shaped for placing packages thereon through said open end;
   an upstanding divider wall slideably fixed to said base and laterally moveable from side to side on said base to provide lateral support to contain packages between said divider wall and at least one of said sidewalls, said divider wall including first and second ends and being oriented generally parallel to said pair of sidewalls;
   cable means coupled to said first and second ends of said divider wall and said base for maintaining the general parallel orientation of said divider wall to said pair of sidewalls as said divider wall moves laterally on said base between said sidewalls to thereby prevent binding of said divider wall on said base, said cable being substantially fixed in length; and
   means for locking said divider wall at a selected use position on said base.

14. An adjustable storage system as defined in claim 13 wherein said base includes first and second corners that are diagonally opposite and further includes third and forth corners that are diagonally opposite, and wherein said cable means includes a first cable section extending from said first corner operably around said first and second ends of said divider wall to said second corner and further includes a second cable extending from said third corner operably around said first and second ends of said upstanding divider wall to said forth corner, to thus positively maintain the general parallel orientation of said divider wall.

15. An adjustable storage system as defined in claim 14 wherein said cable and said pulley are positioned under said base.

16. An adjustable storage system for vehicles comprising:
   a generally U-shaped platform including a base and a pair of sidewalls defining an open end, said platform shaped for placing packages thereon through said open end;
   an upstanding divider wall slideably fixed to said base and laterally moveable from side to side on said base to provide lateral support to contain packages between said divider wall and at least one of said sidewalls;
   means coupled to said divider wall and said base for guiding said divider wall as said divider wall moves laterally on said base between said sidewalls to prevent binding of said divider wall on said base;
   means for locking said divider wall at a selected use position on said base; and
   a telescoping member extending between at lest one sidewall of said base and said divider wall to provide additional lateral support for packages.

17. An adjustable storage system as defined in claim 16 wherein said at least one sidewall has a first slot positioned lengthwise near the upper edge thereof, and said divider wall has a corresponding second slot positioned lengthwise near the upper edge thereof and wherein said telescoping member includes ends which mateably engage said slots.

18. An adjustable storage system as defined in claim 17 wherein said telescoping member is removable.

19. An apparatus as defined in claim 16 wherein said divider wall includes a hand grip located on one of said ends.

20. An adjustable storage system as defined in claim 19 wherein said grip includes a control button which is operably connected to said locking means for locking and releasing said locking means.

21. An adjustable storage system as defined in claim 20 wherein said locking means includes a notched track mounted to said base and a locking pin which is operably connected to said control button such that said pin disengages from said notched track when said control button is depressed and engages said notched track when said control button is released.

22. An adjustable storage system as defined in claim 21 wherein said divider wall includes an enlarged generally triangular-shaped bottom for slideably engaging said base.

23. An adjustable storage system defined in claim 21 wherein said divider wall includes a top, and said control button is located on said divider wall near said top.

24. An adjustable storage system comprising:
   a generally U-shaped platform including a base and a pair of sidewalls defining an open end, said platform shaped for placing packages thereon through said open end;
   an upstanding divider wall slideably fixed to said base and laterally movable from side-to-side on said base to provide lateral support to contain packages between said divider wall and at least one of said sidewalls;
   said base including first and second laterally extending slots, and said divider wall including first and second ends, and further including a first and a second slide extending from said first and second ends respectively for extending into said first and second laterally extending slots in said base for slideably supporting said divider wall on said base;
   said divider wall including a hand grip defining in part by an opening located in said first end, said hand grip including a control button thereon positioned adjacent said opening so that the fingers of an operator can be placed through said opening with the operator's thumb being located approximate said control button;
   means coupled to said divider wall and said base for guiding said divider wall as said divider wall moves laterally on said base between said sidewalls to prevent binding as said divider wall is moved against packages placed on said base; and
   means for locking said divider wall in at least one use position on said base.

25. An adjustable storage system as defined in claim 24 wherein each of said slides are inverted T-shaped members including a center leg extending through said slot in said base and coupled to said divider wall and a cross member which engages the underside of said base to hold said divider wall to said base.

* * * * *

UNITED STATES PATENT AND TRADEMARK OFFICE
CERTIFICATE OF CORRECTION

PATENT NO. : 5,161,700

DATED : November 10, 1992

INVENTOR(S) : Stannis et al.

It is certified that error appears in the above-identified patent and that said Letters Patent is hereby corrected as shown below:

Column 1, Line 21;

"an" should be --and--.

Column 1, Line 68;

After "section" insert --line--.

Column 2, Line 4;

After "member" insert --used--.

Column 4, Line 37;

"and" should be --an--.

Column 4, Line 49;

After "laterally" insert -- . --.

Column 5, Line 9;

"of" should be --or--.

Column 5, Line 58;

After "location" insert -- . --.

Column 6, Line 25;

"with" should be --without--.

UNITED STATES PATENT AND TRADEMARK OFFICE
CERTIFICATE OF CORRECTION

PATENT NO. : 5,161,700

DATED : November 10, 1992

INVENTOR(S) : Stannis et al.

It is certified that error appears in the above-identified patent and that said Letters Patent is hereby corrected as shown below:

Column 6, Line 26;

"as" (second occurrence) should be --in--.

Column 8, Claim 14, Line 60;

"forth" should be --fourth--.

Column 8, Claim 14, Line 66;

"forth" should be --fourth--.

Column 9, Claim 16, Line 22;

"lest" should be --least--.

Signed and Sealed this

Fifteenth Day of February, 1994

Attest:

BRUCE LEHMAN

Attesting Officer

Commissioner of Patents and Trademarks